US012771482B2

(12) United States Patent
Yan et al.

(10) Patent No.: US 12,771,482 B2
(45) Date of Patent: Oct. 20, 2026

(54) NBIOT HARQ RELATED ENHANCEMENT IN NTN

(71) Applicant: Lenovo (Beijing) Ltd., Beijing (CN)

(72) Inventors: Zhi Yan, Xicheng District (CN); Hongmei Liu, Changping District (CN); Yuantao Zhang, Dongcheng District (CN); Yingying Li, Haidian District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 311 days.

(21) Appl. No.: 17/798,990

(22) PCT Filed: Feb. 14, 2020

(86) PCT No.: PCT/CN2020/075189

§ 371 (c)(1),
(2) Date: Aug. 11, 2022

(87) PCT Pub. No.: WO2021/159436

PCT Pub. Date: Aug. 19, 2021

(65) Prior Publication Data

US 2023/0075748 A1 Mar. 9, 2023

(51) Int. Cl.
*H04L 1/1812* (2023.01)
*H04L 1/00* (2006.01)
(Continued)

(52) U.S. Cl.
CPC .......... *H04L 1/1812* (2013.01); *H04L 1/0003* (2013.01); *H04L 1/08* (2013.01); *H04L 1/1678* (2013.01)

(58) Field of Classification Search
CPC ................................ H04L 1/1812; H04L 1/08
See application file for complete search history.

(56) References Cited

U.S. PATENT DOCUMENTS

2017/0163396 A1* 6/2017 Blankenship ......... H04W 72/23
2018/0359775 A1 12/2018 Yi et al.
(Continued)

FOREIGN PATENT DOCUMENTS

CN 107995679 A 5/2018
CN 108076519 A 5/2018
(Continued)

OTHER PUBLICATIONS 202080095911.0 , "Foreign Office Action", CN Application No. 202080095911.0, Dec. 26, 2023, 15 pages.
(Continued)

*Primary Examiner* — Jason E Mattis
*Assistant Examiner* — Latha Chakravarthy
(74) *Attorney, Agent, or Firm* — FIG. 1 Patents

(57) ABSTRACT

Methods and apparatuses for narrowband Internet-of-things (NBIoT) hybrid automatic repeat request (HARQ) related enhancement in a non-terrestrial network (NTN) are disclosed. A method comprises transmitting a control signal, the control signal includes at least one of a transmission repetition number index, a scheduling delay index, a resource assignment index, a NDI, a HARQ resource indication, and a MCS index; and transmitting or receiving a data signal based on the control signal, the data signal starts at the end of the control signal plus a first number of time slots, the data signal includes a second number of transmission repetitions of a third number of time durations.

17 Claims, 4 Drawing Sheets

(51) Int. Cl.
*H04L 1/08* (2006.01)
*H04L 1/1607* (2023.01)

(56) References Cited

U.S. PATENT DOCUMENTS

| | | | | |
|---|---|---|---|---|
| 2019/0363857 | A1* | 11/2019 | Hwang | H04L 5/001 |
| 2020/0396722 | A1* | 12/2020 | Han | H04L 1/0075 |
| 2021/0329533 | A1* | 10/2021 | Kim | H04W 48/12 |
| 2022/0191898 | A1* | 6/2022 | Sergeev | H04W 72/20 |

FOREIGN PATENT DOCUMENTS

| | | | |
|---|---|---|---|
| CN | 108566267 | A | 9/2018 |
| CN | 109068389 | A | 12/2018 |
| EP | 3574599 | A1 | 12/2019 |
| WO | 2017104981 | A1 | 6/2022 |

OTHER PUBLICATIONS 202080095911.0, "Foreign Office Action", CN Application No. 202080095911.0, Jun. 27, 2024, 7 pages.

U.S. Appl. No. 17/798,990 , "International Search Report and Written Opinion", PCT U.S. Appl. No. 17/798,990, filed Nov. 5, 2020, 7 pages.

Mediatek Inc. , "Delay-tolerant re-transmission mechanisms in NR-NTN", 3GPP TSG RAN WG1 Meeting #96bis, Xi'an, China, R1-1904646 [retrieved Sep. 18, 2022]. Retrieved from the Internet <https://www.3gpp.org/ftp/TSG_RAN/WG1_RL1/TSGR1_96b/Docs/>., Apr. 2019, 5 Pages.

PCT/CN2020/075189 , "International Preliminary Report on Patentability", PCT Application No. PCT/CN2020/075189, Aug. 25, 2022, 6 pages.

20918180.9, "Extended European Search Report", EP Application No. 20918180.9, Oct. 10, 2023, 8 pages.

3GPP, "Evolved Universal Terrestrial Radio Access (E-UTRA); Physical layer procedures", 3GPP TS 36.213, V14.5.0. Retrieved from the Internet <https://portal.3gpp.org/desktopmodules/Specifications/SpecificationDetails.aspx?specificationId=2427>, Dec. 31, 2017, pp. 428-448.

Mediatek Inc., "Summary of 7.2.5.4 on more delay-tolerant re-transmission mechanisms in NR-NTN", 3GPP TSG RAN WG1 Meeting #98bis, R1-1911221, Chongqing, China [retrieved Dec. 26, 2023]. Retrieved from the Internet <https://www.3gpp.org/ftp/tsg_ran/WG1_RL1/TSGR1_98b/Docs>, Oct. 2019, 10 pages.

"Foreign Office Action", CN Application No. 202080095911.0, Mar. 7, 2025, 8 pages.

* cited by examiner

NBIOT HARQ RELATED ENHANCEMENT IN NTN

FIELD

The subject matter disclosed herein generally relates to wireless communications, and more particularly relates to methods and apparatuses for NBIoT HARQ related enhancement in non-terrestrial network (NTN).

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Time-Division Duplex (TDD), Time Division Multiplex (TDM), User Entity/Equipment (Mobile Terminal) (UE), Uplink (UL), Universal Mobile Telecommunications System (UMTS), Physical Downlink Shared Channel (PDSCH), Physical Uplink Shared Channel (PUSCH), Physical Uplink Control Channel (PUCCH), Physical Downlink Control Channel (PDCCH), Downlink control information (DCI), single DCI (S-DCI), transmission reception point (TRP), multiple TRP (multi-TRP or M-TRP), frequency range 2 (FR2), Quasi Co-Location (QCL), channel state information reference signal (CSI-RS), CSI-RS Resource Indicator (CRI), Code Division Multiplexing (CDM), Transmission Configuration Indication (TCI), Sounding Reference Signal (SRS), Control Resource Set (CORESET), Synchronization Signal (SS), reference signal (RS), non-terrestrial networks (NTN), terrestrial network (TN), Transport Block (TB), Internet-of-Things (IoT), Narrowband Internet-of-Things (NB-IoT or NBIoT), NBIoT PUSCH (NPUSCH), NBIoT PDCSH (NPDSCH), NBIoT PDCCH (NPDCCH), Machine-Type Communication (MTC), MTC PDCCH (MPDCCH), receiver and transmitter distance (RTD), Hybrid Automatic Repeat reQuest (HARQ), uplink control information (UCI), modulation and coding scheme (MCS), Binary Phase Shift Keying (BPSK), Quadrature Phase Shift Keying (QPSK), new data indicator (NDI).

In Release 13 NBIoT, a downlink TB is mapped to $N_{SF}$ subframes and transmitted with $N_{Rep}$ repetitions. $N_{SF}$ and $N_{Rep}$ are indicated by $I_{SF}$ (resource assignment index) and $I_{Rep}$ (transmission repetition number index) in DCI format N1 separately. The relationship of $N_{SF}$ and $I_{SF}$ is shown in Table 1. The relationship of $N_{Rep}$ and $I_{Rep}$ is shown in Table 2. The scheduling delay of the NPDCCH and corresponding PDSCH (e.g. NPDSCH) is $k_0$. $k_0$ is determined by $I_{Delay}$ (scheduling delay index) (3 bits in DCI) and $R_{max}$ (the configured maximal transmission repetitions of control signal (e.g. NPDCCH)). The scheduling delay index ($I_{Delay}$) is indicated in DCI format N1 with 3 bits. The configured maximal transmission repetitions of control signal ($R_{max}$) is transmitted by RRC signaling. The relationship of scheduling delay ($k_0$) and the scheduling delay index ($I_{Delay}$) and the configured maximal transmission repetitions of control signal ($R_{max}$) is shown in Table 3.

Table 1 indicates the number of subframes ($N_{SF}$) for NPDSCH depending on resource assignment index ($I_{SF}$).

TABLE 1

| $I_{SF}$ | $N_{SF}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 2 indicates the number of repetitions ($N_{Rep}$) for NPDSCH depending on transmission repetition number index ($I_{Rep}$).

TABLE 2

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

Table 3 indicates the scheduling delay $k_0$ depending on the scheduling delay index ($I_{Delay}$) and the configured maximal transmission repetitions of control signal ($R_{max}$).

TABLE 3

| | $k_0$ | |
|---|---|---|
| $I_{Delay}$ | $R_{max} < 128$ | $R_{max} \geq 128$ |
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

FIG. 1 illustrates an example of $N_{SF}$, $N_{Rep}$ and $k_0$, in which NPDCCH schedules NPDSCH. Suppose a DCI scheduling a TB to be transmitted in NPDSCH is transmitted on NPDCCH in subframe N. The TB is mapped to $N_{SF}$ subframes ($N_{SF}$=4 in FIG. 1) and transmitted with $N_{Rep}$ repetitions ($N_{Rep}$=2 in FIG. 1). The starting subframe of the TB is determined by the scheduling delay ($k_0$). That is, the starting subframe of the TB is N+$k_0$.

The long receiver and transmitter distance (RTD) in NTN has an impact on HARQ timing, number of HARQ processes, link level enhancement. The existing NR timing definitions involving DL-UL timing interaction may not hold when there is a large offset in the UE's DL and UL frame timing in NTN. This disclosure targets the enhancement on link level, coverage, scheduling timing, HARQ disabling, UCI feedback, etc, in non-terrestrial network (NTN).

BRIEF SUMMARY

Methods and apparatuses for NBIoT HARQ related enhancement in NTN are disclosed.

In one embodiment, a method comprises transmitting a control signal, the control signal includes at least one of a transmission repetition number index, a scheduling delay index, a resource assignment index, a NDI, a HARQ resource indication, and a MCS index; and transmitting or receiving a data signal based on the control signal, the data signal starts at the end of the control signal plus a first number of time slots, the data signal includes a second number of transmission repetitions of a third number of time durations.

In one embodiment, the third number of time may be is determined by at least one of the resource assignment index ($I_{SF}$), a scaling factor ($K_{SF}$) and the type of network. The second number of transmission repetitions may be determined by at least one of the transmission repetition number index ($I_{Rep}$), a scaling factor ($K_{Rep}$) and the type of network. The control signal may be configured with a fourth number of maximal transmission repetitions, and the fourth number of maximal transmission repetitions may be determined by a scaling factor ($K_{max}$). The first number of time slots may be determined by the scheduling delay index ($I_{Delay}$) and a scaling factor ($K_{Delay}$), especially when the scaling factor ($K_{Rep}$) is configured. Each of the above-identified scaling factors ($K_{SF}$, $K_{Rep}$, $K_{max}$, $K_{Delay}$,) can be determined by at least one of the type of network, HARQ disabling indication, broadcast signal and RRC signal.

In another embodiment, the second number of transmission repetitions may be determined by the transmission repetition number index ($I_{Rep0}$) and an extension index ($K_{RepExt}$). The extension index ($K_{RepExt}$) may be indicated by the NDI or a part of the HARQ resource indication of the control signal.

In some embodiment, the second number of transmission repetitions may be determined by the transmission repetition number index ($I_{Rep0}$) and an index offset ($K_{RepOff}$). The first number of time slots may be determined by the scheduling delay index ($I_{Delay0}$) and an index offset ($K_{DelayOff}$). Each of the above-identified index offset ($K_{RepOff}$, $K_{DelayOff}$) may be determined by at least one of the type of network, HARQ disabling indication, broadcast signal and RRC signal.

In some embodiment, a HARQ disabling of the data signal may be indicated by a state of the MCS index, and MCS of the data signal is indicated by one of the NDI and the HARQ resource indication or a combination of the NDI and the HARQ resource indication of the control signal. In another embodiment, the method further comprises receiving a BPSK repetition sequence with phase shift or a QPSK repetition sequence indicating a downlink transmission indication and ACK or NACK of the data signal. The downlink transmission indication may indicate whether or not a DL decoding probability is larger than a preconfigured threshold in the last fifth number of time periods. The fifth number of time periods may be a minimum value of a predefined time period configured in RRC signaling or broadcast signaling and a time period of two ACK/NACK transmission intervals.

In one embodiment, a method comprises receiving a control signal, the control signal includes at least one of a transmission repetition number index, a scheduling delay index, a resource assignment index, a NDI, a HARQ resource indication, and a MCS index; and transmitting or receiving a data signal based on the control signal, the data signal starts at the end of the control signal plus a first number of time slots, the data signal includes a second number of transmission repetitions of a third number of time durations.

In another embodiment, a remote unit comprises a receiver and a transmitter, wherein the receiver is configured to receive a control signal, the control signal includes at least one of a transmission repetition number index, a scheduling delay index, a resource assignment index, a NDI, a HARQ resource indication, and a MCS index; and the transmitter or the receiver is configured to transmit or receive a data signal based on the control signal, the data signal starts at the end of the control signal plus a first number of time slots, the data signal includes a second number of transmission repetitions of a third number of time durations.

In yet another embodiment, a base unit comprises a transmitter and a receiver, wherein the transmitter is configured to transmit a control signal, the control signal includes at least one of a transmission repetition number index, a scheduling delay index, a resource assignment index, a NDI, a HARQ resource indication, and a MCS index; and the transmitter or the receiver is configured to transmit or receive a data signal based on the control signal, the data signal starts at the end of the control signal plus a first number of time slots, the data signal includes a second number of transmission repetitions of a third number of time durations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
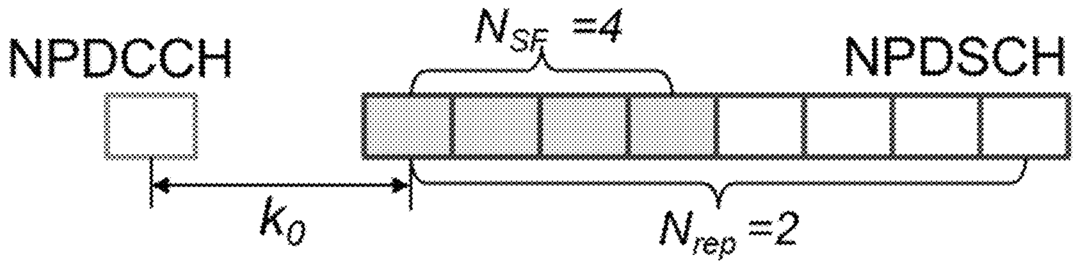
FIG. 1 illustrates an example of $N_{SF}$, $N_{Rep}$ and $k_0$, in which NPDCCH schedules NPDSCH.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

The first embodiment relates to link level enhancement for NBIoT or eMTC.

According to a first sub-embodiment, NBIoT downlink or uplink resource mapping for a particular transport block (i.e. a TB is mapped to several consecutive valid subframes) is determined by, in addition to the existing resource assignment index (e.g. $I_{SF}$), a scaling factor $K_{SF}$ in order to compensate path loss of long distance of satellite. The scaling factor $K_{SF}$ is separately configured depending on network type (e.g. NTN or TN). In other words, NBIoT downlink (or uplink) resource mapping is determined by the network type (e.g., TN or NTN). The networks type may be indicated by higher layer signaling.

For example, in the case of NPDCCH scheduling NPDSCH, a downlink TB can be mapped to $K_{SF}\times N_{SF}$ subframes and transmitted with $N_{Rep}$ repetitions. $N_{SF}$ and $N_{Rep}$ are indicated in DCI format N1 by $I_{SF}$ and $I_{Rep}$ (see Table 1 and Table 2). $K_{SF}$ is configured by higher layer, e.g. by broadcast signaling. So, $K_{SF}$ may be common for all UEs within the NTN network, or within the TN network. For example, for NTN network with HARQ, $K_{SF}$ is set to 2; for NTN network without HARQ, $K_{SF}$ is set to 4; and for TN network, $K_{SF}$ is set to 1.

According to a second sub-embodiment, downlink or uplink NBIoT transmission repetition number (i.e. how many repetitions of the TB are transmitted) is determined by, in addition to the existing transmission repetition number index (e.g. $I_{Rep}$), a scaling factor $K_{Rep}$ in order to compensate path loss of long distance of satellite. The scaling factor $K_{Rep}$ is separately configured depending on network type (e.g. NTN or TN). In other words, NBIoT transmission repetition number is determined by the network type (e.g., TN or NTN). The networks type may be indicated by higher layer signaling.

For example, in the case of NPDCCH scheduling NPDSCH, a downlink TB can be mapped to $N_{SF}$ subframes and transmitted with $K_{Rep}\times N_{Rep}$ repetitions. $N_{SF}$ and $N_{Rep}$ are indicated in DCI format N1 by $I_{SF}$ and $I_{Rep}$ (see Table 1 and Table 2). $K_{Rep}$ is configured by higher layer. For example, for NTN network with HARQ, $K_{Rep}$ is set to 2; for NTN network without HARQ, $K_{Rep}$ is set to 4; and for TN network, $K_{Rep}$ is set to 1.

According to a third sub-embodiment, the table of the number of repetitions (e.g. $N_{Rep}$) is extended to compensate path loss of long distance of satellite, especially for NTN network without HARQ. Table 4 indicates an example of the extended table of the number of repetitions.

TABLE 4

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |
| 16 | 3072 |
| 17 | 4096 |
| 18 | 6144 |
| 19 | 8192 |
| 20 | 12288 |
| 21 | 16384 |

With reference to Table 2, the $N_{Rep}$ can be indicated by $I_{Rep}$ with four (4) bits since there are only 16 possible values for $I_{Rep}$ in Table 2. When the number of repetitions (e.g. $N_{Rep}$) table is extended as illustrated in Table 4, new indication method is necessary.

A first new indication method is to use extension repetition indication. For example, 5 bits can be used to indicate the repetition number. Among the 5 bits, 16 states of the 5 bits are indicated by existing transmission repetition number index (referred to as $I_{Rep0}$ in this embodiment); and extra 1 bit (extension index $K_{RepExt}$) can use the field “NDI” or part of the the field “HARQ-ACK resource” to indicate. The field “NDI” is new data indicator and occupies 1 bit. The field “HARQ-ACK resource” is used to indicate the time and frequency resource for ACK or NACK of the downlink data, and occupies 4 bits in DCI format N1. The field “NDI” or one bit of the field "HARQ-ACK resource" can be used to indicate the extension index ($K_{RepExt}$).

A second new indication method is to use existing transmission repetition number index (referred to as $I_{Rep0}$ in this embodiment) to indicate 4 bits, and to configure a repetition index offset $K_{RepOff}$ to indicate an offset from $I_{Rep0}$. That is, the index $I_{Rep}$ to indicate the repetition number is calculated by $I_{Rep}=I_{Rep0}+K_{RepOff}$. $I_{Rep0}$ is indicated by DCI format N1 (see $I_{Rep}$ in Table 2). $K_{RepOff}$ is configured by higher layer. For example, for NTN network with HARQ, $K_{RepOff}$ is set to 2; for NTN network without HARQ, $K_{RepOff}$ is set to 4; and for TN network, $K_{RepOff}$ is set to 0.

In view of the above, the NBIoT transmission repetition number is determined by an extension repetition indication or by a repetition index offset $K_{RepOff}$ in addition to existing transmission repetition number index.

The above third sub-embodiment is described with reference to the downlink TB (e.g. NPDCCH scheduling NPDSCH). It is apparent that the same extension applies to the uplink TB (e.g. NPDCCH scheduling NPUSCH).

The second embodiment relates to coverage enhancement for NBIoT or eMTC (i.e. NPDCCH or MPDCCH).

The NPDCCH maximum repetition $R_{max}$ is adjusted by a scaling factor $K_{max}$. The scaling factor $K_{max}$ is separately configured depending on network type (e.g. NTN or TN). In other words, maximum repetition is determined by the network type (e.g., TN or NTN).

For example, the maximum repetitions of the NPDCCH is determined by $K_{max}\times R_{max}$. $K_{max}$ is configured by higher layer. For example, for NTN network with or without HARQ, $K_{max}$ is set to 2; and for TN network, $K_{max}$ is set to 1. Accordingly, the NPDCCH blind detection candidates are derived by $K_{max}\times R_{max}$. The configured maximal transmission repetitions of control signal ($R_{max}$) contained in Table 3 should also be updated to $K_{max}\times R_{max}$. For example, the conditions "$R_{max}<128$" and "$R_{max}\geq 128$" should be updated to "$K_{max}\times R_{max}<128$" and "$K_{max}\times R_{max}\geq 128$". Downlink gap scheduling activation condition should also be updated to e.g. $K_{max}\times R_{max}>N_{gap,threshold}$. If the condition is met, an additional DL gap is inserted in NPDCCH and NPDSCH transmissions.

For NPDCCH transmission, the locations of starting subframe k are given by $k=k_b$ where $k_b$ is the $b^{th}$ consecutive NB-IoT DL subframe from subframe k0, excluding subframes used for transmission of SI messages, and $b=u\cdot R$, and $$u = 0, 1, \ldots \frac{R_{max}}{R} - 1,$$

and where subframe k0 is a subframe satisfying the condition $(10n_f+\lfloor n_s/2\rfloor) \bmod T=\lfloor \alpha_{offset}\cdot T\rfloor$, where $T=R_{max}\cdot G\cdot K_{max}$, $T\geq 4$.

For NPDCCH UE-specific search space, G is given by the higher layer parameter npdcch-StartSF-USS, $\alpha_{offset}$ is given by the higher layer parameter npdcch-Offset-USS, $K_{max}=2$ for NTN with or without HARQ, $K_{max}=1$ for TN.

Table 5 illustrates NPDCCH UE-specific search space candidates.

TABLE 5

| $R_{max}\cdot K_{max}$ | R | DCI subframe repetition number | NCCE indices of monitored NPDCCH candidates L' = 1 | L' = 2 |
|---|---|---|---|---|
| 1 | 1 | 00 | {0},{1} | {0,1} |
| 2 | 1 | 00 | {0},{1} | {0,1} |
| | 2 | 01 | — | {0,1} |
| 4 | 1 | 00 | — | {0,1} |
| | 2 | 01 | — | {0,1} |
| | 4 | 10 | — | {0,1} |
| >=8 | $R_{max}\cdot K_{max}/8$ | 00 | — | {0,1} |
| | $R_{max}\cdot K_{max}/4$ | 01 | — | {0,1} |
| | $R_{max}\cdot K_{max}/2$ | 10 | — | {0,1} |
| | $R_{max}\cdot K_{max}$ | 11 | — | {0,1} |

Note 1:
{x}, {y} denotes NPDCCH Format 0 candidate with NCCE index 'x', and NPDCCH Format 0 candidate with NCCE index 'y' are monitored
Note 2:
{x,y} denotes NPDCCH Format1 candidate corresponding to NCCEs 'x' and 'y' is monitored.

In Table 5, the first column criterion is $R_{max}\cdot K_{max}$. In addition, when $R_{max}\cdot K_{max}>=8$, the candidate R is $R_{max}\cdot K_{max}/8$, $R_{max}\cdot K_{max}/4$, $R_{max}\cdot K_{max}/2$ and $R_{max}\cdot K_{max}$, respectively. That is, the scaling factor $K_{max}$ is considered.

The third embodiment relates to scheduling timing enhancement.

Due to the long RTD in NR NTN, an existing offset $K_{offset}$ is introduced to compensate the scheduling delay $k_0$. That is, $delay=k_0+K_{offset}$.

According to the third embodiment, an extra scaling factor $K_{Delay}$ is further introduced to scale the time offset due to increase of transmission repetition number for NBIoT over satellite. The scaling factor $K_{Delay}$ is separately configured depending on network type (e.g. NTN or TN). In other words, the scheduling delay is determined by the network type (e.g., TN or NTN).

For example, $delay=K_{Delay}\times k_0+K_{offset}$. $K_{Delay}$ is configured by higher layer. For example, for NTN network with HARQ, $K_{Delay}$ is set to 2; for NTN network without HARQ, $K_{Delay}$ is set to 4; and for TN network, $K_{Delay}$ is set to 1. $K_{offset}$ is used for compensating the long receiver and transmitter distance (RTD) between eNB and UE in NTN.

In addition, the scheduling delay is preferably compensated in the same way as the repetition number $N_{Rep}$. For example, $K_{Delay}$ may be configured when the scaling factor $K_{Rep}$ is configured. More preferably, $K_{Delay}$ may be configured with the same value as $K_{Rep}$.

Alternatively, instead of introducing the scaling factor $K_{Delay}$, the scheduling delay $k_0$ table may be extended in a similar way to the extended repetition table as illustrated in Table 4. A delay index offset $K_{DelayOff}$ can be configured to indicate an offset from existing scheduling delay index $I_{Delay}$.

Table 5 indicates an example of extended table of the scheduling delay.

TABLE 5

| $I_{Delay}$ | $k_0$ $R_{max} < 128$ | $R_{max} \geq 128$ |
|---|---|---|
| 0 | 0 | 0 |
| 1 | 4 | 16 |

TABLE 5-continued

| $I_{Delay}$ | $k_0$ | |
|---|---|---|
| | $R_{max}$ < 128 | $R_{max}$ ≥ 128 |
| 2 | 8 | 32 |
| 3 | 12 | 64 |
| 4 | 16 | 128 |
| 5 | 32 | 256 |
| 6 | 64 | 512 |
| 7 | 128 | 1024 |
| 8 | 256 | 2048 |
| 9 | 512 | 4096 |
| 10 | 1024 | 8192 |

For example, the index $I_{Delay}$ to indicate the repetition number is calculated by $I_{Delay}=I_{Delay0}+K_{DelayOff}$. $I_{Delay0}$ (see $I_{Delay}$ in Table 3) is indicated in DCI format N1. $K_{DelayOff}$ is configured by higher layer. For example, for NTN network with HARQ, $K_{DelayOff}$ is set to 2; for NTN network without HARQ, $K_{DelayOff}$ is set to 4; and for TN network, $K_{DelayOff}$ is set to 0.

The third embodiment is described with reference to downlink (i.e. NPDCCH scheduling NPDSCH). It is apparent that the same extension applies to uplink (i.e. NPDCCH scheduling NPUSCH).

The fourth embodiment relates to HARQ disabling enhancement.

Due to long RTD in NTN, HARQ disabling is necessary. According to the fourth embodiment, one of unused states of “Modulation and coding scheme” (MCS) field can be used to indicate HARQ disabling. Since the MCS field is used to indicate HARQ disabling, the modulation and coding scheme (MCS) cannot be indicated by the MCS field. On the other hand, as HARQ is disabled, the HARQ related field(s) are unnecessary. Therefore, for example, one of the “NDI” field and the “HARQ-ACK resource” field or a combination of the two fields may be used to indicate the modulation and coding scheme (MCS). In this way, no scheduling flexibility loss is caused.

The fifth embodiment relates to UCI feedback enhancement.

When HARQ feedback and other lower layer feedbacks are disabled, network may have to rely on RLC feedbacks or other higher layer feedbacks, which could lead to a waste of bandwidth. According to the fifth embodiment, a BPSK modulation repetition sequence with sequence element phase shift (each sequence element with two phases for its constellation along with their phase shifts (e.g. clockwise of 90° to another two phases)) is used to indicate a downlink transmission indication and ACK or NACK of the data signal. The downlink transmission indication indicates the DL transmission disruption and requesting DL scheduling change. For example, the downlink transmission indication may indicate whether or not a DL decoding probability is larger than a preconfigured threshold in a last predetermined number of time periods.

For example, two phases of the BPSK modulation repetition sequence element are 45° and 225°, and their 90° clockwise phase shifts are 135° and 315°. Therefore, four different phases can be used to indicate four different situations: ACK of the data signal and positive downlink transmission indication; ACK of the data signal and negative downlink transmission indication; NACK of the data signal and positive downlink transmission indication; and NACK of the data signal and negative downlink transmission indication.

Alternatively, a QPSK modulation repetition sequence (with four phases, e.g., 45°, 135°, 225° and 315°) may be used to indicate the downlink transmission indication and ACK or NACK of the data signal.

The downlink transmission indication indicates whether or not a DL decoding probability is larger than a preconfigured threshold in the last X time periods. The X time periods are a minimum value of {$X_0$, a time period of two ACK/NACK transmission intervals}, in which $X_0$ is configured in RRC signaling or broadcast signaling.

Figure 2:
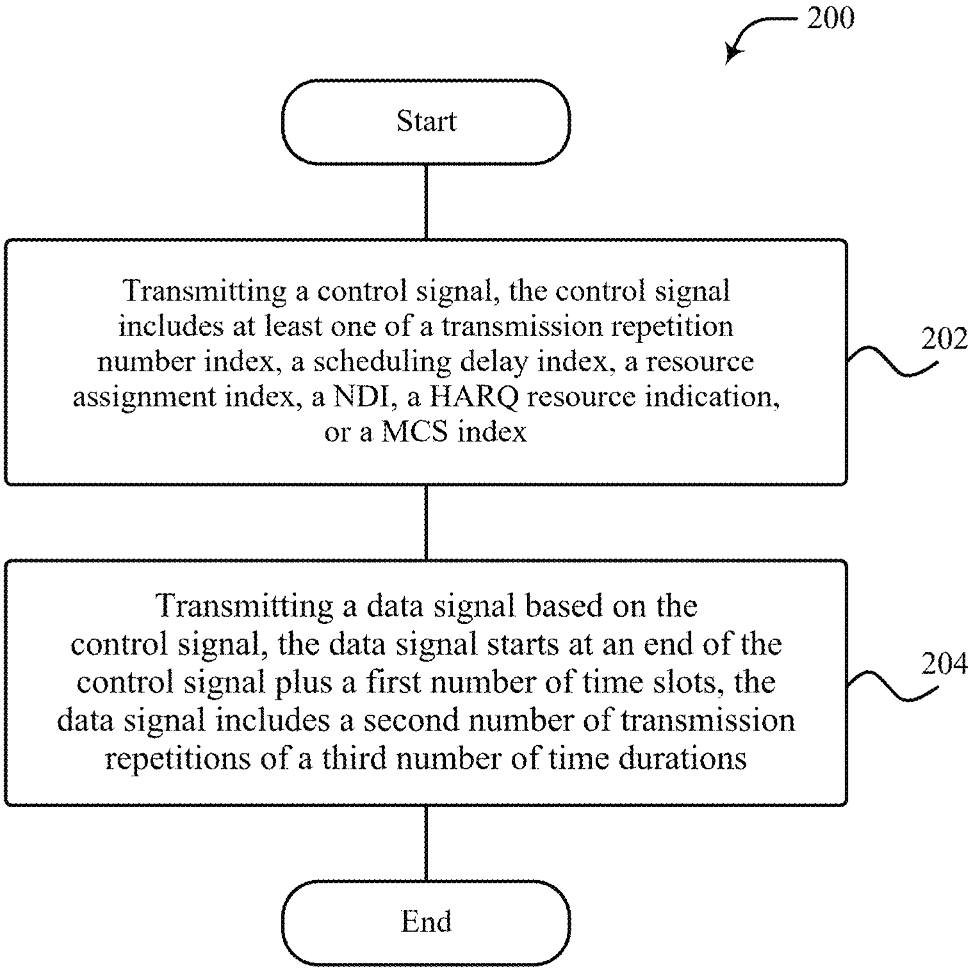
FIG. 2 is a schematic flow chart diagram illustrating an embodiment of a method.

FIG. 2 is a schematic flow chart diagram illustrating an embodiment of a method 200 according to the present application. In some embodiments, the method 200 is performed by an apparatus, such as a base unit. In certain embodiments, the method 200 may be performed by a processor executing program code, for example, a microcontroller, a microprocessor, a CPU, a GPU, an auxiliary processing unit, a FPGA, or the like.

The method 200 may include 202 transmitting a control signal, the control signal includes at least one of a transmission repetition number index, a scheduling delay index, a resource assignment index, a NDI, a HARQ resource indication, and a MCS index; and 204 transmitting or receiving a data signal based on the control signal, the data signal starts at the end of the control signal plus a first number of time slots, the data signal includes a second number of transmission repetitions of a third number of time durations.

Figure 3:
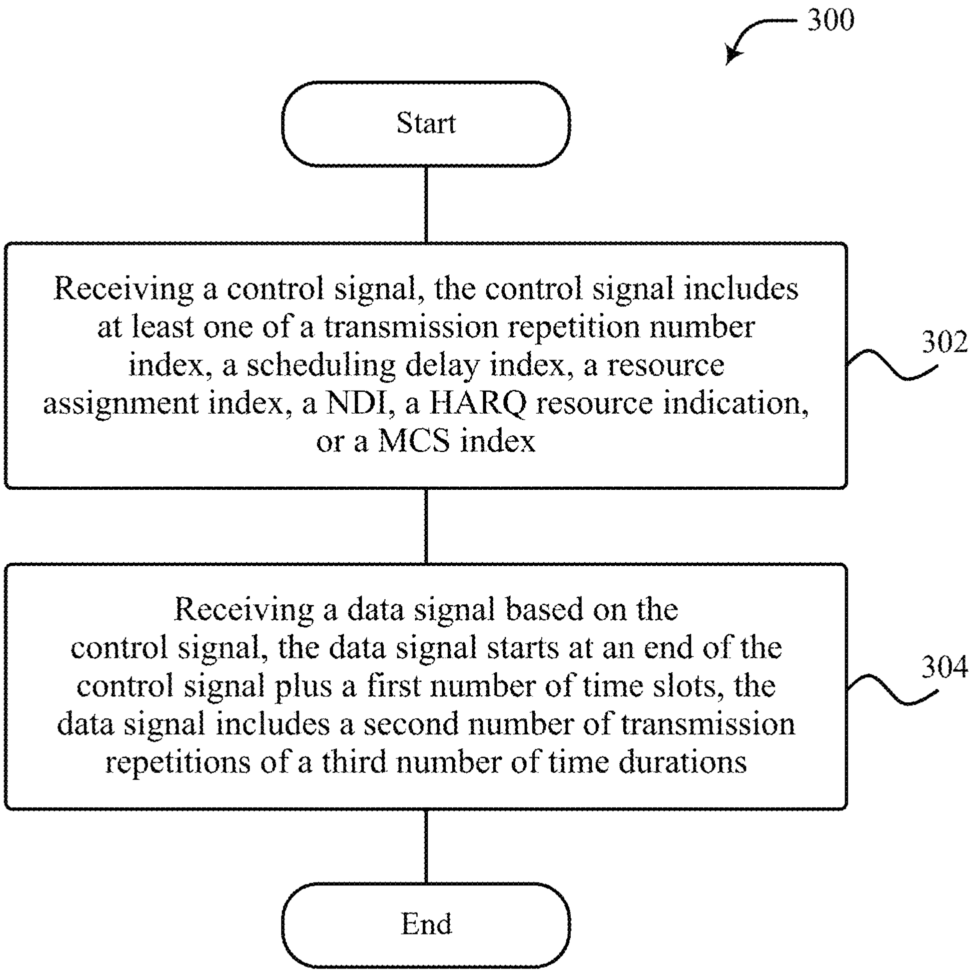
FIG. 3 is a schematic flow chart diagram illustrating a further embodiment of a method.

FIG. 3 is a schematic flow chart diagram illustrating a further embodiment of a method 300 according to the present application. In some embodiments, the method 300 is performed by an apparatus, such as a remote unit. In certain embodiments, the method 400 may be performed by a processor executing program code, for example, a microcontroller, a microprocessor, a CPU, a GPU, an auxiliary processing unit, a FPGA, or the like.

The method 300 may include 302 receiving a control signal, the control signal includes at least one of a transmission repetition number index, a scheduling delay index, a resource assignment index, a NDI, a HARQ resource indication, and a MCS index; and 304 transmitting or receiving a data signal based on the control signal, the data signal starts at the end of the control signal plus a first number of time slots, the data signal includes a second number of transmission repetitions of a third number of time durations.

Figure 4:
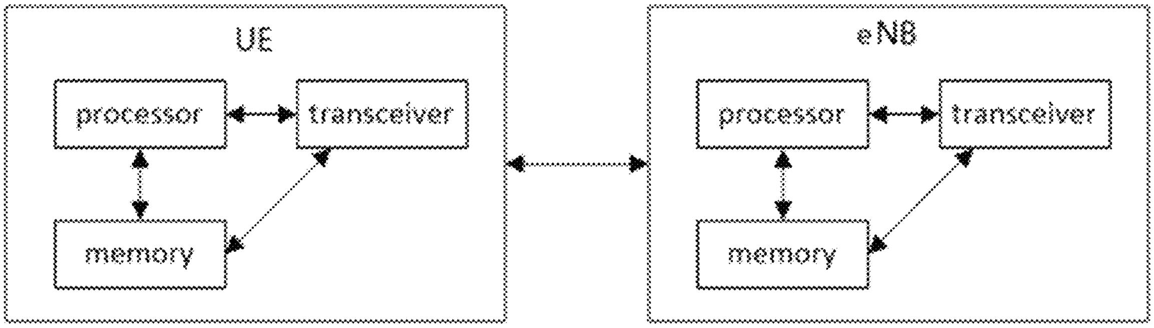
FIG. 4 is a schematic block diagram illustrating apparatuses according to one embodiment.

FIG. 4 is a schematic block diagram illustrating apparatuses according to one embodiment.

Referring to FIG. 4, the UE (i.e. the remote unit) includes a processor, a memory, and a transceiver. The processor implements a function, a process, and/or a method which are proposed in FIG. 3. The eNB (i.e. base unit) includes a processor, a memory, and a transceiver. The processors implement a function, a process, and/or a method which are proposed in FIG. 2. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base unit, the method comprising:

transmitting a control signal, wherein the control signal includes a resource assignment index and at least one of a transmission repetition number index, a scheduling delay index, a new data indicator (NDI), a hybrid automatic repeat request (HARQ) resource indication, or a modulation and coding scheme (MCS) index;

transmitting a data signal based on the control signal, wherein the data signal starts at an end of the control signal plus a first number of time slots and the data signal includes a second number of transmission repetitions of a third number of time durations, wherein the third number of time durations is a quantity of subframes determined based at least in part on the resource assignment index and a scaling factor, wherein the scaling factor scales the quantity of subframes and is configured based on a type of network, and wherein the scaling factor has a first value for a non-terrestrial network (NTN) with HARQ enabled, a second value for an NTN with HARQ disabled, and a third value for a terrestrial network (TN); and receiving a downlink transmission indication and an acknowledgment (ACK) or a negative acknowledgment (NACK) of the data signal based at least in part on a quadrature phase shift keying (QPSK) repetition sequence with a sequence element phase shift, wherein the downlink transmission indication indicates whether a downlink decoding probability is larger than a preconfigured threshold in a last predetermined number of time periods.

2. The method of claim 1, wherein the second number of transmission repetitions is based at least in part on one of the transmission repetition number index, a second scaling factor that scales the second number of transmission repetitions, or the type of network.

3. The method of claim 1, wherein the second number of transmission repetitions is based at least in part on the transmission repetition number index and an extension index.

4. The method of claim 3, wherein the extension index is indicated by the NDI or a part of the HARQ resource indication of the control signal.

5. The method of claim 1, wherein the second number of transmission repetitions is based at least in part on the transmission repetition number index and an index offset.

6. The method of claim 1, wherein the control signal is configured with a fourth number of maximal transmission repetitions, the fourth number of maximal transmission repetitions based at least in part on a second scaling factor that scales the fourth number of maximal transmission repetitions.

7. The method of claim 1, wherein the first number of time slots is based at least in part on the scheduling delay index and a second scaling factor that scales the first number of time slots.

8. The method of claim 1, wherein the first number of time slots is based at least in part on the scheduling delay index and an index offset.

9. A base unit for wireless communication, comprising:

at least one memory; and at least one processor coupled with the at least one memory and configured to cause the base unit to:

transmit a control signal, wherein the control signal includes a resource assignment index and at least one of a transmission repetition number index, a scheduling delay index, a new data indicator (NDI), a hybrid automatic repeat request (HARQ) resource indication, or a modulation and coding scheme (MCS) index;

transmit a data signal based on the control signal, wherein the data signal starts at an end of the control signal plus a first number of time slots and the data signal includes a second number of transmission repetitions of a third number of time durations, wherein the third number of time durations is a quantity of subframes determined based at least in part on the resource assignment index and a scaling factor, wherein the scaling factor scales the quantity of subframes and is configured based on a type of network, and wherein the scaling factor has a first value for a non-terrestrial network (NTN) with HARQ enabled, a second value for an NTN with HARQ disabled, and a third value for a terrestrial network (TN); and receive a downlink transmission indication and an acknowledgment (ACK) or a negative acknowledgment (NACK) of the data signal based at least in part on a quadrature phase shift keying (QPSK) repetition sequence with a sequence element phase shift, wherein the downlink transmission indication indicates whether a downlink decoding probability is larger than a preconfigured threshold in a last predetermined number of time periods.

10. The base unit of claim 9, wherein the second number of transmission repetitions is based at least in part on one of the transmission repetition number index, a second scaling factor that scales the second number of transmission repetitions, or the type of network.

11. The base unit of claim 9, wherein the second number of transmission repetitions is based at least in part on the transmission repetition number index and an extension index.

12. The base unit of claim 9, wherein the second number of transmission repetitions is based at least in part on the transmission repetition number index and an index offset.

13. The base unit of claim 9, wherein the control signal is configured with a fourth number of maximal transmission repetitions, the fourth number of maximal transmission repetitions based at least in part on a second scaling factor that scales the fourth number of maximal transmission repetitions.

14. A remote unit for wireless communication, comprising:

at least one memory; and at least one processor coupled with the at least one memory and configured to cause the remote unit to:

receive a control signal, wherein the control signal includes a resource assignment index and at least one of a transmission repetition number index, a scheduling delay index, a new data indicator (NDI), a hybrid automatic repeat request (HARQ) resource indication, or a modulation and coding scheme (MCS) index;

receive a data signal based on the control signal, wherein the data signal starts at an end of the control signal plus a first number of time slots and the data signal includes a second number of transmission repetitions of a third number of time durations, wherein the third number of time durations is a quantity of subframes determined based at least in part on the resource assignment index and a scaling factor, wherein the scaling factor scales the quantity of subframes and is configured based on a type of network, and wherein the scaling factor has a first value for a non-terrestrial network (NTN) with HARQ enabled, a second value for an NTN with HARQ disabled, and a third value for a terrestrial network (TN); and transmit a downlink transmission indication and an acknowledgment (ACK) or a negative acknowledgment (NACK) of the data signal based at least in part on a quadrature phase shift keying (QPSK) repetition sequence with a sequence element phase shift, wherein the downlink transmission indication indicates whether a downlink decoding probability is larger than a preconfigured threshold in a last predetermined number of time periods.

15. The remote unit of claim 14, wherein the second number of transmission repetitions is based at least in part on one of the transmission repetition number index, a second scaling factor that scales the second number of transmission repetitions, or the type of network.

16. The remote unit of claim 14, wherein the second number of transmission repetitions is based at least in part on the transmission repetition number index and an extension index.

17. A method performed by a remote unit, the method comprising:

receiving a control signal, wherein the control signal includes a resource assignment index and at least one of a transmission repetition number index, a scheduling delay index, a new data indicator (NDI), a hybrid automatic repeat request (HARQ) resource indication, or a modulation and coding scheme (MCS) index;

receiving a data signal based on the control signal, wherein the data signal starts at an end of the control signal plus a first number of time slots and the data signal includes a second number of transmission repetitions of a third number of time durations, wherein the third number of time durations is a quantity of subframes determined based at least in part on the resource assignment index and a scaling factor, wherein the scaling factor scales the quantity of subframes and is configured based on a type of network, and wherein the scaling factor has a first value for a non-terrestrial network (NTN) with HARQ enabled, a second value for an NTN with HARQ disabled, and a third value for a terrestrial network (TN); and transmitting a downlink transmission indication and an acknowledgment (ACK) or a negative acknowledgment (NACK) of the data signal based at least in part on a quadrature phase shift keying (QPSK) repetition sequence with a sequence element phase shift, wherein the downlink transmission indication indicates whether a downlink decoding probability is larger than a preconfigured threshold in a last predetermined number of time periods.

* * * * *